Oct. 7, 1958  H. D. LYONS  2,855,437
NEUTRALIZATION PROCESS
Filed June 6, 1955
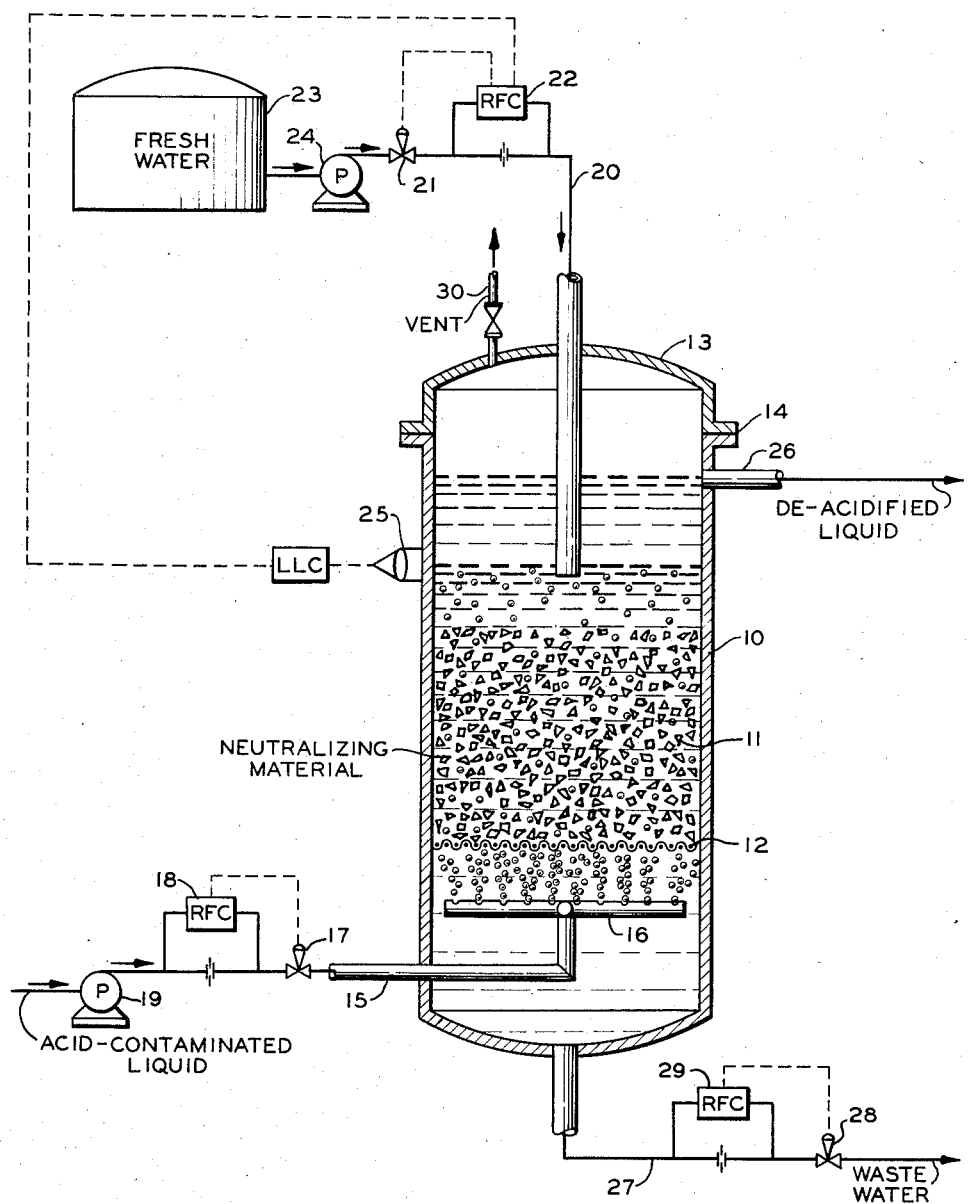
INVENTOR.
H. D. LYONS
BY
*Hudson and Young*
ATTORNEYS

2,855,437
NEUTRALIZATION PROCESS

Harold D. Lyons, Bartlesville, Okla., assignor to Phillips Petroleum Company, a corporation of Delaware Application June 6, 1955, Serial No. 513,524

11 Claims. (Cl. 260—586)

This invention relates to the neutralization of liquids. In one aspect this invention relates to contacting a liquid to be neutralized with a neutralizing material and simultaneously revivifying said neutralizing material. In another aspect this invention relates to flowing a stream of liquid through a bed of neutralizing material and simultaneously flowing a stream of water through said bed countercurrent to said stream of liquid.

The problem of neutralizing acid or base containing liquids is a problem which must be faced in many industries wherein liquids are treated with acids or bases or an acid or base is produced as a by-product in a process wherein the main product is a liquid. For example, in the petroleum industry hydrocarbons are frequently treated with acid to improve the color or other properties thereof and frequently residual acid from said treatment must be removed from the hydrocarbons. In alkylation processes employing an acid catalyst, such as hydrofluoric acid or sulfuric acid, the effluent from the reaction zone must be neutralized. Another example is when an acid catalyst is used in the polymerization of the hydrocarbons. Still another example is the neutralization of the acids formed as a by-product in the direct air oxidation of cyclohexane to cyclohexanone.

Many processes have been developed for the neutralization of such acid containing streams. These include such methods as scrubbing the liquid to be neutralized with a liquid neutralizing material or contacting said liquid with a slurry of a neutralizing material. Both of these methods have disadvantages. In liquid treating processes the problem of entrainment is present and in the slurry type processes proper contacting of the liquid to be treated is always a problem because of difficulties in maintaining the slurry and subsequent difficulties in separating the slurry from the liquid being treated. Another method commonly used, and which has advantages over liquid-liquid methods or slurry type methods, is to pass the liquid which is to be treated over a fixed bed of the neutralizing material. However, a major difficulty in the latter method is the formation of salts, resulting from the neutralizing reaction, which tend to coat the surface of the neutralizing material and destroy its neutralizing activity. This results in short runs because of shutdowns necessary to regenerate or replace the neutralizing material. Because of these short runs, such processes are not amenable to continuous operation for extended periods of time.

I have developed a process for neutralizing a liquid whereby the above difficulties are eliminated or at least mitigated. When operating according to my invention the surface of the neutralizing material is continuously revivified simultaneously with the neutralization reaction and the liquid being neutralized is given a final concomitant wash, thereby removing any remaining traces of the contaminating material.

Broadly speaking, my invention comprises neutralizing a stream of liquid by passing same over a bed of neutralizing material in the presence of a countercurrently flowing stream of water. Thus, the salts which form as a result of the neutralizing reaction are removed as they are formed and long continuous runs are made possible.

An object of this invention is to provide a process for neutralizing liquids.

Another object of this invention is to effect removal of acidic materials from liquids.

Another object of this invention is to continuously revivify the surface of a neutralizing material simultaneously with employing said material to neutralize a liquid.

Still another object of this invention is to prevent deposition of deactivating salts on the surface of a neutralizing agent, employed to neutralize acid containing liquids, by removing said salts as they are formed.

Still another object of this invention is to provide a process for neutralizing a liquid by contacting said liquid with a neutralizing agent in the presence of a countercurrently flowing stream of water.

Other aspects, objects and advantages of the invention will be apparent, to those skilled in the art, from the accompanying disclosure and discussion.

Thus according to the invention there is provided a process for neutralizing acidic materials contained in an organic liquid which comprises contacting a stream of said liquid with a neutralizing material in the presence of a stream of water flowing countercurrently to said stream of liquid.

While the process of my invention can be used for neutralizing any acid containing organic liquid, it is particularly adapted for removing water insoluble acids, whose salts, formed by the reaction of said acids with the neutralizing material, are more water soluble than said acid. The only limitation on my process is a practical one, i. e., the salt formed must be sufficiently water soluble that excessive quantities of water (from an economic standpoint) are not required to remove said salts from the surface of the neutralizing material. As a practical limit I have found that said salts should be soluble at least to the extent of 0.5 gram per 100 cc. of water, preferably to the extent of 1 gram per 100 cc. of water. Examples of acids which are substantially water insoluble and a salt thereof which is more soluble in water than the acid are:

Butyric acid_____ 5.6 g./100 g. $H_2O$ @ 5° C.
Calcium butyrate_____ 22.4 g./100 g. $H_2O$ @ 20° C.
Adipic acid_____ 1.5 g./100 g. $H_2O$ @ 15° C.
Calcium adipate_____ 5.3 g./100 g. $H_2O$ @ 15° C.
Caproic acid_____ 0.4 g./100 g. $H_2O$ @ 20° C.
Calcium caproate_____ 2.18 g./100 g. $H_2O$ @ 20° C.

It is to be noted that the ater flows countercurrent to the stream of organic liquid which is being neutralized. Countercurrent flow is advantageous from several standpoints. For example, when co-current flow is employed there is generally a greater dispersion of the water in the organic liquid being treated and separation of the two phases is generally more troublesome than when counter-current flow is employed. Another advantage of countercurrent flow is that the organic liquid being treated is given a concomitant wash with water of ever increasing purity, and is finally washed with substantially pure water. It is presently preferred to operate my process with water as the continuous phase in the treating zone and to pass the organic liquid as dispersed droplets through the water. However, my process can be operated with the organic liquid as the continuous phase. When water is the continuous phase it completely surrounds the particles of neutralizing material in the treating zone and is therefore more effective in removing salts which tend to coat said neutralizing materials. If the organic liquid is the continuous phase only droplets of water contact the neutralizing material and said water is less effective in removing said salts.

The attached drawing illustrates one form of apparatus which can be employed for carrying out the method of my invention.

Referring now to the drawing the invention will be more fully explained. Reference numeral 10 designates a cylindrical, vertically disposed treating chamber having therein a fixed bed of a neutralizing material 11 supported by a screen 12. While chamber 10 is illustrated as being vertically disposed it should be understood that horizontally disposed treating chambers can also be employed. Said chamber 10 is closed at its upper end by a closure member 13 attached thereto by means of flange 14. While not shown in the drawing chamber 10 can be equipped with a similar closure member at its lower end similarly attached to said lower end. A first conduit 15 extends into the lower portion of said chamber 10 and terminates in a distributor member 16, suitably supported by means not shown, and positioned beneath said screen 12. Positioned in said conduit 15 is a motor valve 17 operatively connected to rate of flow controller 18 which controls the rate of introduction of one liquid into chamber 10 through said conduit 15 by means of pump 19. Extending into the upper portion of said chamber 10 is a second conduit 20 having a motor valve 21 mounted therein. Motor valve 21 is operatively connected to rate of flow controller 22 which controls the rate of introduction of a second liquid into chamber 10 from tank 23 by means of pump 24. Liquid level controller 25 is mounted in the wall of chamber 10 and serves to control the level of the interface between said first and second liquids. While one type of level control is shown in the drawing it should be understood that other types of liquid level controllers can be employed. Liquid level controller 25 is operatively connected to rate of flow controller 22 and resets said rate of flow controller 22 responsive to the level of the interface between said first and second liquids in chamber 10. Conduit 20 preferably extends below the level of said interface. A third conduit 26 extends from the upper portion of said chamber 10 and serves as a withdrawal means for the less dense of said first and second liquids. A fourth conduit 27 extends from a point below the level of distributor 16 in the lower portion of chamber 10 and serves as withdrawal means for the more dense of said first and second liquids. Mounted within said conduit 27 is a motor valve 28 operatively connected to rate of flow controller 29 which controls the rate of withdrawal through conduit 27.

In operation, according to my presently preferred method of operation, column 10 is first filled with water to a point above the top of bed 11 but below the level of conduit 26. Organic liquid containing acidic material is then introduced through conduit 15 and is dispersed as droplets by means of distributor 16 into the continuous water phase in chamber 10. Said droplets "bubble" up through the water and form an upper phase which floats on said water. After formation of the upper phase the desired flow rates are established and the operation is on stream. The organic liquid passes up through the water, contacts the particles of neutralizing material 11 and the acidic materials in said liquid are neutralized. As the organic liquid flows up the column it is contacted countercurrently by the water flowing down the column. Said water, being the continuous phase completely surrounds the particles of neutralizing material and dissolves, as they are formed, salts which otherwise tend to deposit on the surface of the neutralizing material and destroy its activity. Thus the active surface of the neutralizing material is simultaneously revivified as the acidic materials in the organic liquid are neutralized. As said organic liquid continues to flow up the column it is concomitantly washed with the downflowing water. De-acidified organic liquid is withdrawn through conduit 26 and water is withdrawn through conduit 27.

Any suitable alkaline material can be used as the neutralizing material in the method of my invention. The neutralizing material employed should be substantially insoluble in water and unreactive with the organic liquid which is being treated. The terms "water insoluble" and "insoluble in water" as used herein and in the claims, as applied to the neutralizing material, means a material having a solubility in water less than 0.5 percent by weight, preferably less than 0.2 percent under the conditions employed. The actual choice of neutralizing material will depend upon the organic material being treated, the type of acid or contaminating material contained in said material, the amount of said acid present in said organic liquid, etc. as will be understood by those skilled in the art. A presently preferred class of neutralizing materials are the basic compounds of the alkaline earth metals. Examples of which are, calcium hydroxide, calcium carbonate, magnesium carbonate, magnesium hydroxide, magnesium oxide, barium carbonate, strontium carbonate, etc. For economic reasons calcium carbonate is a presently preferred neutralizing material. Oyster shells, being approximately 97 percent calcium carbonate, are a convenient and economic source of calcium carbonate. Other forms of calcium carbonate such as limestone and marble can also be employed. As mentioned above the salt formed by the reaction between the acid and the neutralizing material should be appreciably soluble in water. For example, since calcium sulfate is soluble in water only to the extent of about 0.29 gram per 100 grams of water it would be preferable to employ a magnesium compound as the neutralizing material when one is neutralizing an organic liquid containing sulfuric acid. The neutralizing material can be employed in lump, granular or powdered form. When using granular or powdered material the particle size can range from about 1 to 200 mesh. In most instances it is presently preferred to use a neutralizing material having a particle size of from 10 to 30 mesh. When employing crushed oyster shell as the neutralizing material a convenient source of said oyster shell is that known as "chick grade" in the poultry industry and which is commercially available.

The flow rate of the organic liquid being treated and the flow rate of the countercurrently flowing water through the treating chamber will depend upon the acid content and the desired degree of removal of said acid as will be understood by those skilled in the art. In countercurrent operation, when operating with the water as a continuous phase, the water rate cannot be so great as to cause the organic liquid to be carried out the bottom of the treating chamber with said water. When neutralizing the oxidation effluent from the air oxidation of cyclohexane to cyclohexanone, as described hereinafter, I have found that the water rate can be conveniently maintained within 3 to 300 volumes per volume of neutralizing material per hour, preferably between 6 to 150 volumes per volume of neutralizing material per hour. With such water rates the organic liquid rate can be conveniently maintained within the range of 30 to 600 volumes per volume of neutralizing material per hour, preferably between 60 and 300 volumes per volume of neutralizing material per hour.

Any suitable temperature and pressure, depending upon the type of organic liquid being treated and the acid contained therein, can be employed in carrying out my invention. Of course, it will be understood that the pressure should be such as to maintain said organic liquid and water in liquid phase.

While the invention is described herein as applying to the neutralization of acids contained in the oxidation effluent from the air oxidation of cyclohexane to cyclohexanone, the invention can be employed for neutralizing any liquid which is substantially immiscible with water. If the liquid happens to be slightly soluble in water, the liquid which is dissolved in the water withdrawn from the treating chamber can be recovered by distillation. It is also apparent from the description of the invention given herein that the invention can be employed for neutralizing byproduct acids in the oxidation effluent from any process wherein any type of hydrocarbon is oxidized to its primary oxidation products. Thus for example, the invention can be applied to the oxidation effluent from the oxidation of alkanes and alkenes, including both alkyl and aryl alkanes and alkenes, as well as to the oxidation effluent of cycloparaffins and aryl compounds, including their substituted derivatives. The term "primary oxidation products" is employed herein to include alcohols, ketones, hydroperoxides, peroxides, and other oxygenated derivatives of hydrocarbons. It does not include such products as carbon monoxide, carbon dioxide, water, etc. Examples of oxidation processes from which the oxidation effluent can be neutralized according to the invention include, among others, the oxidation of: alkanes such as pentanes, hexanes, octanes, decanes, etc., and alkyl derivatives thereof; alkenes such as pentenes, heptenes, octenes, decenes, etc., and alkyl derivatives thereof; naphthenes such as cyclopentane, methylcyclopentane, dimethylcyclopentane, methylethylcyclopentane, cyclohexane, methylcyclohexane, dimethylcyclohexane, and diethylcyclohexane, etc.; naphthenyl cyclopentanes and cyclohexanes such as bicyclopentane, bicyclohexane, methylbicyclopentane, and methylbicyclohexane; etc.; hydroaromatics such as decahydronaphthalene, and methyldecahydronaphthalene etc.; olefinic cyclic hydrocarbons such as cyclopentadiene, cyclohexadiene and alkyl substituted derivatives thereof etc.; alkenyl substituted cyclic hydrocarbons such as ethenylcyclopentane, ethenylcyclohexane, methylethenylcyclopentane, and dimethylethenylcyclohexane, etc.; and aryl hydrocarbons such as benzene, toluene, etc.

It will be understood by those skilled in the art that the particular products obtained, i. e., alcohols, ketones, peroxides, etc., will depend upon the hydrocarbon being oxidized, the reaction conditions etc. Any of the well known processes for the oxidation of hydrocarbons can be employed. For example, cyclohexane can be oxidized to cyclohexanone and cyclohexanol by blowing with air at a temperature of about 380° F., and a pressure of about 500 p. s. i. g., for a period of time, and in an amount sufficient to effect the desired degree of oxidation.

When the process of the invention is carried out at elevated temperatures, particularly above about 100° C., peroxidic materials, particularly hydroperoxides, are decomposed.

Examples of organic liquids, not necessarily obtained by oxidation of hydrocarbons, which can be neutralized according to my invention are: liquid hydrocarbons, saturated and unsaturated, cyclic and acyclic, aromatic, naphthenic and paraffinic; ethers, alcohols, aldehydes, ketones, heterocyclics etc.

As stated above, my invention is particularly adapted for removing from an organic liquid those acids which are only sparingly soluble or substantially insoluble in water. However, the invention can be employed to neutralize water soluble acids. With water soluble acids a simple water wash will be sufficient in many instances. However, in those instances where disposal of the resulting acid water is a problem it is advantageous to employ my invention because, not only can a more efficient job of neutralizing be effected, but also said acid water is eliminated since it is not formed. For example, in neutralizing a hydrocarbon containing sulfuric acid one would employ magnesium carbonate as the neutralizing material and the waste water would contain magnesium sulfate, not sulfuric acid as when only a simple water wash is employed.

The following examples will serve to explain the invention still more fully and to illustrate some of the advantages of the invention.

EXAMPLE I

A one volume sample of the oxidation effluent from the air oxidation of cyclohexane to cyclohexanone was passed by gravity flow over about two volumes of dry "chick grade" crushed oyster shell. Samples of the organic liquid were analyzed for acid content before and after passage over said oyster shell. The acids in said organic liquid are believed to be a mixture of formic, acetic, caproic, butyric and adipic. The larger proportion of the acids was probably caproic acid. The results as shown in Table II below indicate the ineffectiveness of this method of neutralization since only about 31 percent of the acids in the organic liquid were removed.

EXAMPLE II

The run of Example I was repeated except that said oyster shell was first flushed with water. The water was drained and the organic liquid then passed over the wet oyster shell. The results shown in Table II below indicate an improvement over the method of Example I but also show that this method of neutralization is still inefficient.

EXAMPLE III

In another run a 50 percent by weight slurry of pure calcium carbonate in water was added to a two volume sample of the same organic liquid employed in Example I contained in a neutralization vessel. A mechanical stirrer was employed to keep the mixture agitated while increasing amounts of said slurry and additional water were added to the neutralization vessel. Samples were withdrawn at frequent intervals during the course of the run. All samples were analyzed for acid content by titrating 10 ml. of the organic liquid with 0.2 N sodium hydroxide. Table I shows the results obtained in this method of neutralizing.

*Table I*

| Total Amt. of Slurry Added, grams | Total Time Stirred, minutes | Total Amt. Water Added, ml. | Ml. 0.2 N Base to Neutralize 10 cc. Sample |
|---|---|---|---|
| 0 | 0 | 0 | 6.5 |
| 65 | 5 | 0 | 3.7 |
| 65 | 9 | 0 | 3.6 |
| 146 | 14 | 0 | 3.1 |
| 146 | 19 | 0 | 3.0 |
| 146 | 24 | 100 | 2.7 |
| 285 | 29 | 100 | 2.3 |
| 401 | 39 | 100 | 1.6 |
| 401 | 49 | 200 | 1.3 |
| 521 | 79 | 200 | 1.2 |
| 631 | 109 | 200 | 1.0 |

EXAMPLE IV

A countercurrent neutralization apparatus, similar to that illustrated in the drawing, having 1200 volumes of "chick grade" crushed oyster shell therein was used for this run. The column was filled with water to a point above the top of the bed of said oyster shells. Organic liquid containing acidic material was introduced into the lower portion of the treating chamber through a suitable distributor and allowed to "bubble up" through the water. An upper layer of organic liquid was established on top of the water layer, the desired flow rates were established with water flowing countercurrently to the organic liquid and the operation maintained continuously over a period of six hours. During said six hour period 7,150 volumes of the acid containing organic liquid was passed upwardly through the bed of oyster shells countercurrently to the downwardly flowing stream of water. Samples of the treated organic liquid were withdrawn at frequent intervals and analyzed for acid content by titrating 10 ml. of organic liquid with 0.2 N sodium hydroxide. The results of this method of neutralization are given in Table II below which also presents a comparison of the results in all four of the above examples.

Table II

| Method of Example | Amt. Acids Removed, Percent | Amt. CaCO₃ Used per Volume Organic Liquid, gm./100 cc. | Ml. Base for Titration Before | Ml. Base for Titration After | Wgt. H₂O Used, gm. |
|---|---|---|---|---|---|
| 1 | 31.4 | 206 | 6.7 | 4.6 | none. |
| 2 | 69.1 | 172 | 5.5 | 1.7 | shells wet. |
| 3 | 84.8 | 31.5 | 6.5 | 1.0 | 515. |
| 3 | 81.5 | 26 | 6.5 | 1.2 | 460. |
| 4 | 80.5 | 16.4 | 4.6 | 0.9 | 1630. |

It can be seen from Table II that the countercurrent continuous method of the present invention is about 100 percent better than the use of a slurry. The method of this invention is simpler in operation and more efficient in the use of the CaCO₃.

Various modifications of the invention can be made or carried out in the light of the above disclosure without departing from the spirit or scope of said disclosure or the claims.

I claim:

1. In neutralizing an acid containing organic liquid wherein said liquid is contacted with a solid neutralizing agent insoluble in water and which reacts with said acid to form salts which tend to coat the surface of said agent and thereby reduce its neutralizing activity, the method which comprises flowing a stream of water as a continuous phase through a fixed bed of said neutralizing agent and simultaneously flowing said organic liquid through said bed as a dispersed phase countercurrent to said stream of water.

2. A method for neutralizing acidic materials contained in a stream of liquid hydrocarbon which comprises: continuously passing a stream of said acid containing hydrocarbons upwardly as a dispersed phase through a treating zone containing a fixed bed of a solid granular neutralizing material which is insoluble in water; continuously passing a stream of water as a continuous phase downwardly through said treating zone; withdrawing treated hydrocarbon from the upper portion of said zone; and withdrawing water from the lower portion of said zone.

3. A method according to claim 2 wherein said neutralizing material is crushed oyster shell.

4. In the neutralization of an acid containing organic liquid wherein said liquid is contacted with a solid neutralizing agent insoluble in water and which reacts with said acid to form salts which tend to coat the active surface of said agent and thereby reduce its neutralizing activity, the method which comprises, passing said liquid upwardly as a dispersed phase through a bed of said neutralizing agent, simultaneously revivifying the active surface of said agent with a stream of water flowing as a continuous phase countercurrently to said stream of liquid, and concomitantly and subsequently water washing said liquid.

5. In the neutralization of an acid containing organic liquid oxidation product obtained by the oxidation of a hydrocarbon to a primary oxidation product wherein said product is contacted with a solid neutralizing agent insoluble in water and which reacts with said acid to form salts which tend to coat the active surface of said agent and thereby reduce its neutralizing activity, the method which comprises, passing said product through a bed of said neutralizing agent, simultaneously revivifying the active surface of said agent with a stream of water flowing countercurrently as a continuous phase to said stream of product flowing as a dispersed phase and concomitantly and subsequently water washing said product.

6. A method for neutralizing acidic materials contained in an organic liquid stream effluent from the air oxidation of cyclohexane to cyclohexanone which comprises: passing a stream of said liquid upwardly as a dispersed phase through a treating zone containing a fixed bed of crushed oyster shell at a rate within the range of 30 to 600 volumes per volume of oyster shell per hour; continuously passing a stream of water downwardly as a continuous phase through said treating zone at a rate within the range of 3 to 300 volumes per volume of oyster shell; maintaining a level of water above said bed; withdrawing treated organic liquid from the upper portion of said zone at a point above said level of water; and withdrawing water from the lower portion of said zone.

7. In a process for neutralizing an acid containing organic liquid wherein said liquid is passed through a fixed bed of a solid neutralizing agent insoluble in water and which reacts with said acid to form salts which tend to coat the surface of said agent and thereby reduce its neutralizing activity, the improvement which comprises passing a stream of water downward as a continuous phase through said bed of said neutralizing agent; simultaneously passing said organic liquid upward through said bed as a dispersed phase countercurrent to said stream of water with concomitant neutralization and water washing; and further washing treated organic liquid in a level of fresh water maintained above said bed.

8. In a process for the neutralization of an acid containing organic liquid wherein said liquid is contacted with a solid neutralizing agent insoluble in water and which agent reacts with said acid to form salts which tend to coat the surface of said agent and thereby reduce its neutralizing activity, the improved method of operation which comprises: introducing a stream of said liquid into the lower portion of a treating zone containing a bed of said neutralizing agent; passing said liquid upwardly through said bed of neutralizing agent; introducing a stream of water into the upper portion of said treating zone above said bed of neutralizing agent; passing said water downwardly through said bed of neutralizing agent as a continuous phase countercurrent to said stream of liquid being passed upwardly as a dispersed phase so as to simultaneously revivify the active surface of said neutralizing agent and concomitantly wash said upflowing liquid; maintaining a predetermined interfacial level of water above the top of said bed; further washing said liquid in said level of water maintained above said bed; and controlling the amount of water introduced into said zone in accordance with the level of said water.

9. A method according to claim 8 wherein said organic liquid stream is an effluent product stream from the air oxidation of cyclohexane.

10. A process according to claim 8 wherein said neutralizing agent is selected from the group consisting of calcium hydroxide, calcium carbonate, magnesium carbonate, magnesium hydroxide, magnesium oxide, barium carbonate, and strontium carbonate.

11. A process according to claim 8 wherein said salts formed by the neutralization of said acid are more soluble in water than said acid.

References Cited in the file of this patent

UNITED STATES PATENTS

| | | |
|---|---|---|
| 48,367 | Chesebrough | June 27, 1865 |
| 1,716,028 | Canon | June 4, 1929 |
| 1,952,622 | Caldwell | Mar. 27, 1934 |
| 1,968,397 | Howes | July 31, 1934 |
| 2,552,670 | Fleming | May 15, 1951 |
| 2,609,395 | Dougherty et al. | Sept. 2, 1952 |
| 2,615,921 | Dougherty et al. | Oct. 28, 1952 |

OTHER REFERENCES

Pierre: Chem. Abst., vol. 24 (1930), p. 1920.